(12) United States Patent
Pueyo et al.

(10) Patent No.: US 9,563,689 B1
(45) Date of Patent: Feb. 7, 2017

(54) GENERATING AND APPLYING DATA EXTRACTION TEMPLATES

(71) Applicant: Google Inc., Mountain View, CA (US)

(72) Inventors: Luis Garcia Pueyo, San Francisco, CA (US); Vanja Josifovski, Los Gatos, CA (US); Amitabh Saikia, Mountain View, CA (US); Jie Yang, Santa Clara, CA (US); Mike Bendersky, Sunnyvale, CA (US); Srinidhi Viswanatha, Bangalore (IN); Marc-Allen Cartright, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 14/470,510

(22) Filed: Aug. 27, 2014

(51) Int. Cl.
*G06F 17/30* (2006.01)
(52) U.S. Cl.
CPC .............................. *G06F 17/30598* (2013.01)
(58) Field of Classification Search
CPC ............... G06F 17/30598; G06F 17/30705; G06F 17/30707; G06F 17/3071; G06F 17/30713
USPC ........................................ 707/736, 737, 738
See application file for complete search history.

(56) References Cited

U.S. PATENT DOCUMENTS

| | | | |
|---|---|---|---|
| 7,475,010 B2 | 1/2009 | Chao | |
| 7,496,500 B2 | 2/2009 | Reed et al. | |
| 7,512,605 B2 | 3/2009 | Spangler | |
| 7,660,804 B2 | 2/2010 | Wen et al. | |
| 7,836,012 B1 | 11/2010 | Nevill-Manning et al. | |
| 8,046,226 B2 | 10/2011 | Soble et al. | |
| 8,055,707 B2 | 11/2011 | Desai et al. | |
| 8,082,248 B2 | 12/2011 | Abouyounes | |
| 8,108,206 B2 | 1/2012 | Hufnagel et al. | |
| 8,239,387 B2 | 8/2012 | Madaan et al. | |
| 8,364,467 B1 | 1/2013 | Bowman et al. | |
| 8,583,648 B1 | 11/2013 | Majkowska | |

(Continued)

FOREIGN PATENT DOCUMENTS

| | | |
|---|---|---|
| WO | 2013082151 | 6/2013 |
| WO | 2013192583 | 12/2013 |

OTHER PUBLICATIONS

Kolya, Anup Kumar et al, "A Hybrid Approach for Event Extraction," Polibits (46) 2012, pp. 55-59, ISSN 1870-9044.

(Continued)

*Primary Examiner* — Hares Jami
(74) *Attorney, Agent, or Firm* — Middleton Reutlinger

(57) ABSTRACT

Methods, apparatus, and computer-readable media are provided for generating and applying data extraction templates. In various implementations, a corpus of structured communications such as emails may be grouped into clusters based on one or more similarities between the structured communications. A set of structural paths may be identified from structured communications of a particular cluster. One or more structural paths of the set may be classified as transient wherein a count of occurrences of one or more associated segments of text across the particular cluster satisfies a criterion. One or more transient paths may be assigned a semantic data type and/or a confidentiality designation based on various signals. A data extraction template may be generated to extract, from subsequent structured communications, segments of text associated with transient (and in some cases, non-confidential) structural paths.

18 Claims, 5 Drawing Sheets

(56) References Cited

U.S. PATENT DOCUMENTS

| | | | |
|---|---|---|---|
| 8,630,989 | B2 | 1/2014 | Blohm et al. |
| 8,775,400 | B2 | 7/2014 | Ickman et al. |
| 2004/0044674 | A1 | 3/2004 | Mohammadioun et al. |
| 2006/0168006 | A1 | 7/2006 | Shannon et al. |
| 2009/0012824 | A1 | 1/2009 | Brockway et al. |
| 2010/0100815 | A1 | 4/2010 | Hutchinson et al. |
| 2010/0179961 | A1 | 7/2010 | Berry et al. |
| 2010/0325115 | A1* | 12/2010 | Xu .................. G06Q 10/10 707/749 |
| 2011/0106892 | A1 | 5/2011 | Nelson et al. |
| 2012/0215853 | A1 | 8/2012 | Sundaram et al. |
| 2012/0254388 | A1 | 10/2012 | Duxbury et al. |
| 2012/0317499 | A1 | 12/2012 | Shen |
| 2013/0138655 | A1* | 5/2013 | Yan ............... G06F 17/30867 707/738 |
| 2013/0239016 | A1 | 9/2013 | Adams et al. |
| 2013/0311875 | A1 | 11/2013 | Pappas et al. |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Black, Julie et al, "Automated Event Extraction from Email," Jun. 2, 2004, (http://nlp.stanford.edu/courses/cs224n/2004/jblack-final-report.pdf ), 12 pages.

Paone, Lauren "Learned Automatic Recognition Extraction of Appointments from Email," 2006 (http://www.seas.upenn.edu/~cse400/CSE400_2005_2006/Paone/paper.pdf), 12 pages.

Walther, Maximilian "Unsupervised Extraction of Product Information from Semi-structured Sources," Computational Intelligence and Informatics (CINTI), 2012 IEEE 13th International Symposium , Nov. 20-22, 2012, 6 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

Grigalis, et al., "Using XPaths of Inbound Links to Cluster Template-Generated Web Pages," Department of Information Systems, Vilnius Gediminas Technical University, Lithuania, Computer Science and Information Systems, Oct. 25, 2013, 11(1):111-131.

Hachenberg, Christian et al., "Locality Sensitive Hashing for Scalable Structural Classification and Clustering of Web Documents," CIKM'13 Oct. 27-Nov. 1, 2013, San Francisco, CA, USA, Copyright 2013 ACM 978-1-4503-2263-8/13/10, 10 pages.

Chang, Chia Hui et al., "A Survey of Web Information Extraction Systems," Knowledge and Data Engineering, IEEE Transactions on , vol. 18, No. 10, Oct. 2006, pp. 1411-1428.

Abou-Shoer, Mohamed I. et al, "Extract-Template Modeling and Pattern Recognition in the Assessment of (Cymbopogon Proximus)," American Journal of Analytical Chemistry, vol. 2 No. 4, 2011, pp. 500-510.

Bonomi, Luca et al., "A Two-Phase Algorithm for Mining Sequential Patterns with Differential Privacy," ACM International Conference on Information and Knowledge Management, Oct. 27-Nov. 1, 2013, Burlingame, California, 10 pages.

Chang, Chia-Hui et al., "IEPAD: Information Extraction Based on Pattern Discovery," Proceedings of the 10th International Conference on World Wide Web, 2001, ACM, New York, NY, USA, pp. 681-688.

* cited by examiner

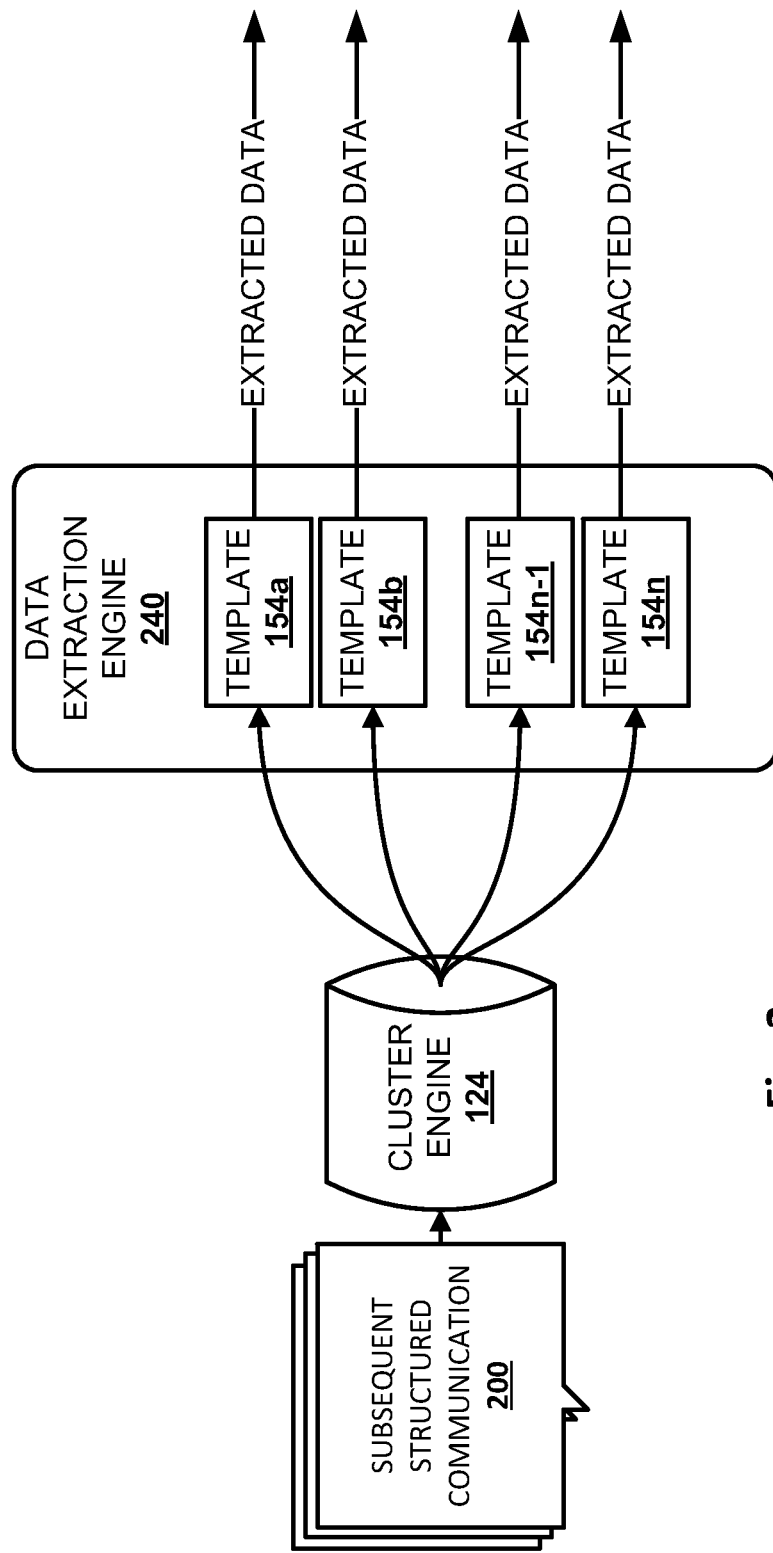

| | | | |
|---|---|---|---|
| To: | c.h.smith@email.com | Date: 1/2/2013 | |
| From: | utopia_A2@utopiaair.com | | |
| Subject: | Charles, your journey to Utopia awaits! | | |

*Utopian Airways*

| | | | |
|---|---|---|---|
| Monday, July 14<br>Utopian Airways<br>Flight No. 530 | Departs:<br>Arrives: | 8:00 am Louisville, KY<br>9:36 am Cleveland, OH | Seat 16A |
| Monday, July 14<br>Utopian Airways<br>Flight No. 66 | Departs:<br>Arrives: | 10:05 am Cleveland, OH<br>11:56 am Manchester, NH | Seat 18A<br>Seat 16B |
| Tuesday, July 15<br>Utopian Airways<br>Flight No. 546 | Departs:<br>Arrives: | 6:30 pm Manchester, NH<br>9:19 pm Atlanta, GA | Seat 23A<br>Seat 23A |
| Tuesday, July 15<br>Utopian Airways<br>Flight No. 2491 | Departs:<br>Arrives: | 9:59 pm Atlanta, GA<br>11:20 pm Louisville, KY | Seat 4<br>Seat 34E |

Passenger Information:

Charles H. Smith
Payment:
123456 Hayward Lane
Louisville, KY 556633
502-555-2588
c.h.smith@email.com

Payment:

$567.32 on Amex 123456789
Exp. Date: 01/02/2019

Please arrive at the Airport at least 45 minutes prior to the scheduled departure. One checked bag flies free, any subsequent bags incur an additional charge of $30.

Fig. 3    300

GENERATING AND APPLYING DATA EXTRACTION TEMPLATES

BACKGROUND

Business-to-consumer ("B2C") emails and similar communications (more generally referred to herein as "structured communications") may often follow more structured patterns than person-to-person emails, and often are created automatically using templates. However, these templates are not typically made available to entities interested in extracting data from these communications.

SUMMARY

The present disclosure is generally directed to methods, apparatus and computer-readable media (transitory and non-transitory) for analyzing a corpus of structured communications such as B2C emails to generate one or more data extraction templates. The generated one or more data extraction templates may be configured to extract non-confidential transient data from subsequent structured communications, while ignoring confidential transient data or fixed data that is shared among the structured communications of the corpus (e.g., boilerplate). For example, the data extraction template may be used to extract, from an email, non-confidential transient data (e.g., information that alone cannot be used to identify someone) such as departure time, arrival time, arrival airport, product purchased, shipping date, etc. Confidential information (e.g., information that could be used to identify someone) such as a recipient's name, address, credit card number, and so forth, as well as fixed boilerplate, may be ignored.

In some implementations, a corpus of emails may be initially grouped into a plurality of clusters based on similarities between the structured communications and/or their metadata. For instance, flight itinerary emails from one airline may form one cluster; flight itinerary emails from another airline may form another cluster. A data extraction template may then be generated for each cluster as described above. Subsequent structured communications may be analyzed using the same technique as was used to initially group the corpus of structured communications into clusters. The cluster to which a subsequent structured communication is matched may dictate the data extraction template that is used to extract transient non-confidential data from the structured communication.

In some implementations, a computer implemented method may be provided that includes the steps of: grouping a corpus of structured communications into a plurality of clusters based on metadata associated with each structured communication; identifying, from structured communications of a particular cluster, a set of structural paths; classifying a first structural path of the set of structural paths, associated with a first segment of text, as transient in response to a determination that a count of occurrences of the first segment of text across the particular cluster satisfies a criterion; and generating a data extraction template to extract, from one or more structured communications, one or more segments of text associated with the transient structural path. This method and other implementations of technology disclosed herein may each optionally include one or more of the following features.

In various implementations, the metadata associated with each structured communication may include a subject. In various implementations, the metadata associated with each structured communication may include data indicative of a sending entity. In various implementations, the grouping may include associating a plurality of different sender identifiers with a single sending entity based on one or more textual patterns shared among the plurality of different sender identifiers.

In various implementations, the method may further include assigning a semantic data type to the transient structural path based on one or more signals related to the structured communications of the particular cluster. In various implementations, the one or more signals may include a context of the structured communications of the particular cluster, one or more fixed segments of text contained in structured communications of the particular cluster within a particular distance of the first segment of text, and/or one or more patterns detected in the first segment of text.

In various implementations, the method may further include classifying a second structural path of the set of structural paths, associated with a second segment of text, as fixed in response to a determination that a frequency of occurrences of the second segment of text across the particular cluster does not satisfy the criterion. In various implementations, the method may further include configuring the data extraction template so that one or more segments of text associated with the fixed structural path are ignored in one or more structured communications.

In various implementations, identifying the set of paths may include identifying, based on structured communications of the particular cluster, a set of XPaths. In various implementations, the identifying may include generating a bipartite graph, with the set of structural paths forming a first set of structural path nodes and corresponding textual segments forming a second set of textual segment nodes, and edges connecting structural path nodes to corresponding textual segment nodes.

In various implementations, generating the data extraction template may include generating the data extraction template to ignore, in one or more structured communications, one or more segments of text associated with the transient structural path in response to a determination, based on one or more signals related to structured communications of the particular cluster, that a semantic data type of the transient structural path is confidential.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example of how data may be extracted from a subsequent structured communication using one or more templates generated in FIG. 1.

FIG. 3 depicts an example structured communication with portions that may be transient, fixed, confidential and/or non-confidential.

DETAILED DESCRIPTION

Figure 1:
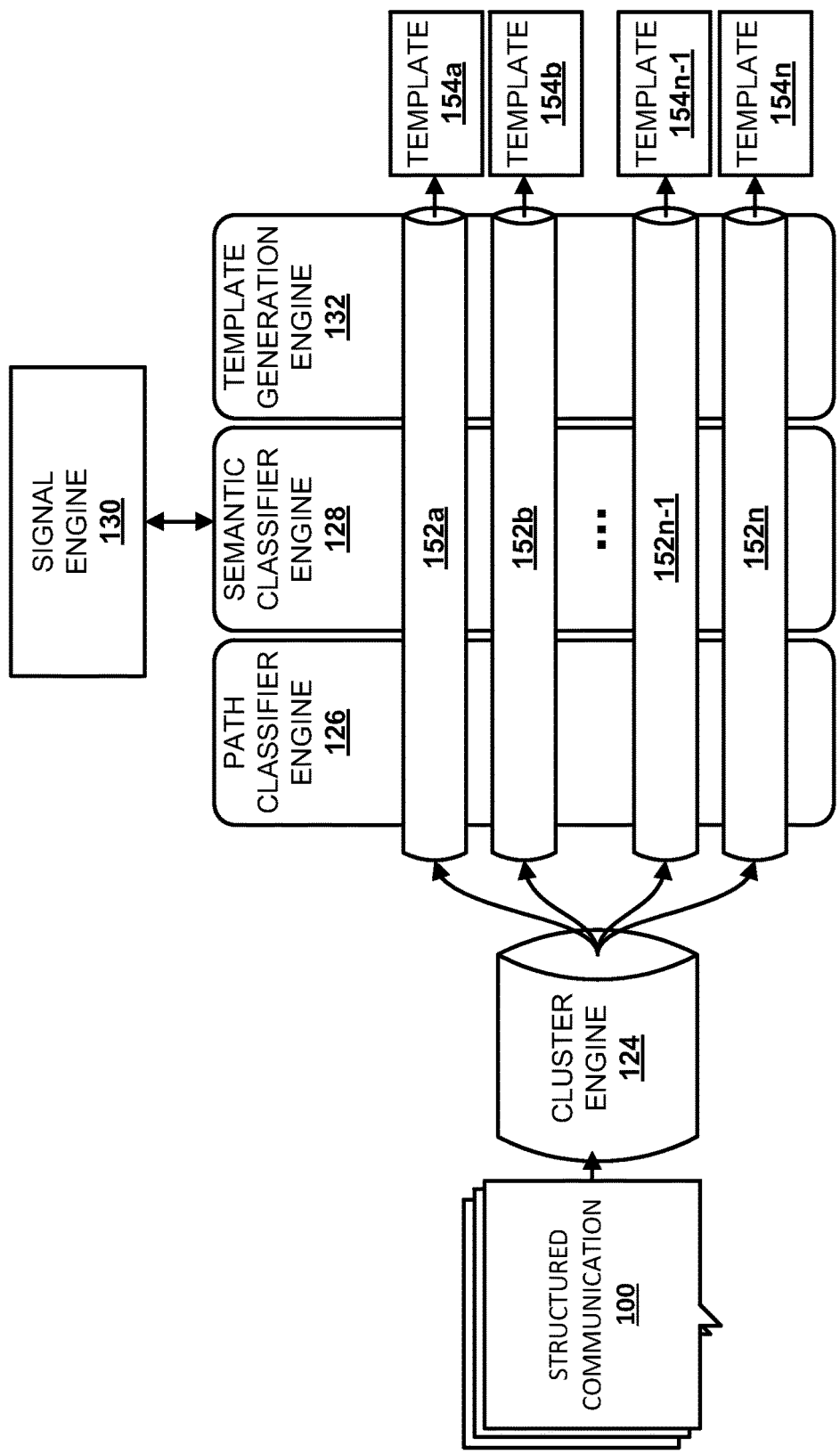
FIG. 1 illustrates an example of how a corpus of structured communications may be analyzed by various components of the present disclosure to generate one or more data extraction templates.

FIG. 1 illustrates an example environment in which a corpus of structured communications 100 may be grouped into clusters 152a-n, and in which clusters of structured communications may be analyzed to generate data extraction templates 154a-n. As used herein, a "structured communication" may refer to an email, a text message (e.g., SMS, MMS), an instant message, or any other structured communication, particularly B2C communications, that are typically (but not always) automatically generated. In various implementations, structured communications may be structured using various markup languages such as the Extensible Markup Language ("XML") or the Hypertext Markup Language ("HTML"), though this is not required. In various implementations, a structured communication 100 may include various metadata. For instance, emails may include one or more sender identifiers (e.g., sender email addresses), one or more recipient identifiers (e.g., recipient email addresses, including cc'd and bcc'd recipients), a date sent, one or more attachments, a subject, and so forth.

In some implementations, a cluster engine 124 may be configured to group the corpus of structured communications 100 into a plurality of clusters 152a-n based on one or more patterns shared among one or more structured communications 100 within the corpus. In some implementations, cluster engine 124 may have one or more preliminary filtering mechanisms to discard communications that are not suitable for template generation. For example, if a corpus of structured communications 100 under analysis includes personal emails and B2C emails, personal emails may be discarded. Cluster engine 124 may utilize various aspects of structured communications 100 to group B2C and other similar structured communications into clusters, such as metadata, formatting information (e.g., HTML nodes, xPaths, etc.), textual similarities, byte similarities, and so forth. In some implementations, cluster engine 124 may use metadata such as a sending entity or a subject of email, alone or in combination, to select a cluster to which the email belongs.

Cluster engine 124 may use various techniques to perform structured communication clustering. In some implementations, cluster engine 124 may be configured to analyze an email subject using one or more regular expressions. For example, emails from a particular sending entity (which may include emails from more than one email address) may be analyzed to determine a frequency of words found in the emails' subjects. Words satisfying a particular criterion (e.g., a frequency threshold) may be considered "fixed." Words that do not satisfy the criterion may be considered "transient." In some implementations, the emails' subjects may then be analyzed again to generate regular expressions. Fixed terms may remain unchanged in the regular expressions (e.g., represented as "constants"). Transient words/ terms may be replaced with regular expression wildcards. In some implementations, each element of the set of unique regular expressions may represent a unique cluster. An email may be assigned to a cluster associated with a regular expression that best matches the email's subject. A cluster may be considered a "best match" for an email based on various metrics, such as the cluster having the longest matching regular expression for the email's subject.

Additionally or alternatively, structured communications such as emails may be clustered based on structural similarities. For example, a set of xPaths for an email (e.g., a set of addresses to reach each node in the email's HTML node tree) may be independent of the email's textual content. Thus, the similarity between two or more such emails may be determined based on a number of shared xPaths. An email may be assigned to a particular cluster based on the email sharing a higher number of xPaths with emails of that cluster than with emails of any other cluster. Additionally or alternatively, two email may be clustered together based on the number of xPaths they share compared to, for instance, a total number of xPaths in both emails.

In some implementations, structured communications such as emails may be clustered additionally or alternatively based on textual similarities. For example, emails may be analyzed to determine shared terms, phrases, ngrams, ngrams plus frequencies, and so forth. Based on these data points, emails may be clustered. For example, emails sharing a particular number of shared phrases and ngrams may be clustered together.

In some implementations, emails may even be grouped into clusters based on byte similarity. For instance, emails may be viewed as strings of bytes that may include one or both of structure (e.g., metadata, xPaths) and textual content. In some implementations, a weighted combination of two or more of the above-described techniques may be used as well. For example, both structural and textual similarity may be considered, with a heavier emphasis on one or the other.

Once a corpus of structured communications are grouped into clusters 152a-n, each cluster may contain structured communications that are highly likely to include the same boilerplate and structure, and to have transient data (which may be the primary data of interest for extraction) in approximately the same locations (e.g., spatially and/or in terms of the same xPath). Path classifier engine 126, semantic classifier engine 128, and template generation engine 132 may then perform various downstream processing to produce data extraction templates 154a-n for clusters 152a-n.

Path classifier engine 126 may be configured to identify, from structured communications of a particular cluster 152, a set of structural paths. As used herein, a "structural path" may refer to an address (e.g., through markup language nodes) to reach a node in a structured communication. xPaths are one such example. "Structural paths" may exist for various types of markup languages, including but not limited HTML as mentioned previously, and XML. In some implementations, path classifier engine 126 may collect all xPaths from all structured communications in a particular cluster 152 into a set. Path classifier engine 126 may then classify the structural paths in the set in various ways depending on the nature of text or other data that are associated with the structural paths.

For example, in some implementations, path classifier engine 126 may classify a structural path underlying a segment of text that is not shared among all emails (e.g., a recipient's name, address, phone number, a particular departure or arrival time, a purchased product or price, and so forth) of a cluster as "transient." In some implementations, path classifier engine 126 may classify a particular structural path underlying a particular segment of text as transient in response to a determination, e.g., by path classifier engine

126, that a count of occurrences of the particular segment of text across the particular cluster satisfies some criterion (e.g., a frequency threshold).

By contrast, path classifier engine 126 may classify another structural path that is associated with a segment of text that is shared among all (or most) structured communications of the cluster as "fixed" (e.g., boilerplate). In various implementations, path classifier engine 126 may classify a particular structural path associated with a particular segment of text as fixed in response to a determination, e.g., by path classifier engine 126, that a count of occurrences of the particular segment of text across the particular cluster fails to satisfy the aforementioned threshold, or satisfies another threshold. Various criteria may be used to determine that a structural path underlying a particular segment of text is transient or fixed, such as a minimum/maximum threshold (e.g., if the segment of text is found in less or more than a particular number of emails in a cluster, or in a percentage of the emails that is above or below a threshold).

Suppose a particular segment of text such as a specific departure time (e.g., May 1, 2015 at 8:00 am) or a specific product purchased (e.g., "Acme model 35986 Box Wrench") is only shared among a small number of emails in a cluster (or even only in a single email). That segment of text is not likely boilerplate, but instead is likely transient data of potential interest for extraction. Path classifier engine 126 may classify the structural path underlying that segment of text as "transient." In contrast, another segment of text such as "Departure time:" or "Delivery Estimate:" that is repeated among numerous emails in a cluster may likely be boilerplate (although as noted below it may be used as a signal by semantic classifier engine 128). Path classifier engine 126 may classify the structural path underlying that segment of text as "fixed."

In some implementations, path classifier engine 126 may construct a bipartite graph. Nodes in a first set may represent structural paths. Nodes in a second set may represent corresponding segments of text, with edges to the corresponding nodes in the first set. Edges between nodes in the first and second sets may be weighted, e.g., by a number of occurrences of a particular segment of text in association with a particular structural path. The node pairs may be sorted by their edge weights, and those weights that satisfy a particular threshold (e.g., less than a predetermined weight or some other similar threshold) may be considered "transient." Node pairs having edges with weights that satisfy some other threshold (e.g., greater than the predetermined weight) may be considered "fixed."

Suppose a cluster of emails are from a particular airline and are meant to communicate itineraries to passengers. One structural path (e.g., "/html/body/div/h3/") of the set of structural paths obtained from the emails of the cluster may be represented by a first node with a value, "/html/body/div/h3/". That first node may be connected to a textual node (e.g., "Departure Airport:") via an edge. That edge may have a weight that satisfies a threshold because most if not all emails of the cluster will likely include the text "Departure Airport:" in association with the same xPath. Accordingly, that first node (and its corresponding structural path) may be classified as "fixed."

Another structural path (e.g., "/html/body/div/p") of the set of structural paths obtained from the emails of the cluster may be represented by a second node with a value, "/html/body/div/p". That second node may be connected via numerous edges to numerous textual nodes representing strings of text describing different departure airports. Many of those edges may therefore have weights that that do not satisfy the aforementioned threshold, or that satisfy a different threshold (e.g., less than 5% of node pairs reflect that correspondence). Accordingly, that second node (and its corresponding structural path) may be classified as "transient."

In some implementations where a bipartite graph is constructed, an algorithm such as the following may be implemented:

graph={ }
    for each email in cluster
        for each xpath in email
            text=GetText(xpath)
            graph[text]=xpath
            graph[xpath]=text
        end for
    end for
    xpath_set=SortAllXPaths(graph)

A data extraction template (e.g., 154) may be generated from a bipartite graph generated using this algorithm. In some embodiments, a data extraction template 154 may include a sorted sequence of fixed structural paths, transient structural paths, and/or fixed segments of text.

In some embodiments, a particular textual node may have a frequency f that is equal to a number of times that textual string is observed across emails of a cluster. Textual nodes with frequencies f that satisfy a particular threshold or function may be classified as fixed. The following are examples of functions that may be used to classify a textual node as fixed or transient, with N being a positive integer that is equal to a number of emails in a cluster:

A textual may be fixed where f/N>threshold $$\text{where threshold} = \text{upper\_limit} - 2/3 \times \sqrt{\frac{N}{k}} \times (\text{upper\_limit} - \text{lower\_limit})$$

"upper_limit" may be a maximum fraction or percentage of structured communications to consider something fixed. For example, if upper_limit is equal to 0.2, then every segment of text that appears in more than 20% of structured communications of a cluster is considered fixed. "lower_limit" may be a minimum fraction or percentage of structured communications to consider something fixed. For example, if lower_limit is equal to 0.01, then every segment of text that appears in less than 1% of structured communications of a cluster is considered transient. k may be a constant selected based on various criteria. In some implementations, k may be a number of structured communications at which a curve representing the threshold peaks, flattens, and even begins decreasing. For example, if a cluster includes a relatively large number of emails, then k may be reduced. "min_occurrence_ratio_range" may be a difference between a maximum percentage allowed and a minimum percentage allowed.

Semantic classifier engine 128 may be configured to determine semantic data types to be assigned to the transient structural paths classified by path classifier engine 126. Semantic classifier engine 128 may make these determinations based on various signals. Some signals may be associated with structured communications of a particular cluster of structured communications, and may include things like metadata (e.g., sending entity, textual patterns in subjects, etc.) and content of structured communications, particularly segments of text associated with structural paths that are considered "fixed." In some implementations, a signal engine 130 may be configured to obtain, organize and/or provide such signals to semantic classifier engine 128.

One example signal that may be used by semantic classifier is a context of the structured communications of a particular cluster. Suppose the cluster includes emails from a particular airline reporting itineraries to passengers. That general context may enable semantic classifier engine 128 to search for cues that might typically be located in such emails, such as words like "Departure," "Depart," etc., particularly in combination with other cues, such as a colon following a particular word. For example, one or more fixed segments of text contained in structured communications of the cluster within a particular distance of a particular segment of text may be analyzed to determine what the particular segment of text is meant to communicate. If a transient xPath underlying a segment of text, "May 1, 2015 at 8:00 am," is immediately preceded by a fixed xPath underlying a segment of text, "Depart," and particularly if a colon or dash is between them, then semantic classifier engine may classify the transient xPath as a Departure Date/Time. Additionally or alternatively, semantic classifier engine 128 may assign a semantic data type to a particular transient structural path based on one or more patterns in segments of text associated with the transient structural path (e.g., "MM/DD/YY," "MM/DD/YYYY," "$dd,ddd.dd," etc.). In various implementations, semantic classifier engine 128 may use other techniques, including one or more machine learning classifiers (e.g., regular-expression based, non-linear trained with external data), to detect semantic data types for transient structural paths.

In some implementations, semantic classifier engine 128 may employ various techniques to protect information users may consider sensitive or otherwise confidential. For example, semantic classifier engine 128 may classify (or reclassify) one or more structural paths, previously classified as transient, as "confidential." In subsequent processing of structured communications (see FIG. 2), segments of text associated with transient, but confidential, structural paths may be ignore or otherwise discarded.

Semantic classifier engine 128 may classify (or reclassify) a particular structural path as confidential based on various signals. For example, sensitive data like credit card numbers or social security numbers may have known numeric patterns that semantic classifier engine 128 may recognize. Semantic classifier engine 128 may also determine that an otherwise transient structural path should be deemed confidential based on semantic data types assigned to other structural paths, e.g., located nearby in a structured communication. For example, a user's departure date alone may not be considered sensitive. However, if a nefarious party where to learn about a user's departure date in combination with the user's identity and/or address, that nefarious party may deduce that the user will be out of town as of the departure date. In such a scenario, semantic classifier engine 128 may classify the structural path underlying the departure date in the email as non-confidential transient, but may classify structured paths underlying other information that could be used to identify the user, such as their name, address, phone number, email address, job title, etc., as confidential. Some semantic data types may automatically be classified, e.g., by semantic classifier engine 128, as confidential, such as credit card numbers, user-identifying information (e.g., name, social security number, full address, etc.), information related to a user's health, and so forth.

Template generation engine 132 may be configured to generate one or more data extraction templates 154a-n, e.g., based the classified structural paths provided by path classifier engine 126 and/or semantic classifier engine 128. Those data extraction templates may be usable by various components (see FIG. 2) to extract, from one or more structured communications, one or more segments of text associated with transient (and in some cases, non-confidential) structural paths.

Operations performed by cluster engine 124, path classifier engine 126, semantic classifier engine 128, signal engine 130 and/or template generation engine 132 may be performed on individual computer systems, distributed across multiple computer systems, or any combination of the two. These one or more computer systems may be in communication with each other and other computer systems over one or more networks (not depicted).

FIG. 2 depicts an example of how subsequent structured communications 200 may be analyzed after a plurality of data extraction templates 154a-n have been generated. Cluster engine 124 may be configured to employ techniques similar to those described above to determine which cluster structured communications 200 should be associated with. Based on that decision, a data extraction engine 240 may apply the data extraction template (e.g., one of 154a-n) to the structured communication to extract the appropriate data. For example, data extraction engine 240 may utilize a particular template 154 to extract segments of text associated with non-confidential transient structural paths from the structured communication 200. Data extraction engine 240 may likewise ignore or discard segments of text associated with confidential and/or fixed structural paths.

FIG. 3 depicts a hypothetical email 300 showing how various portions of the email 300 may be classified, e.g., by path classifier engine 126 and/or semantic classifier engine 128, in accordance with various implementations. Email 300 includes various metadata, visible examples of which include a recipient email address ("c.h.smith@email.com"), a sender email address ("utopia_A2@utopiaair.com"), a date received (Jan. 2, 2013) and a subject ("Charles, your journey to Utopia awaits").

Suppose email 300 is part of a corpus being used to generate one or more data extraction templates. As noted above, various metadata may be used to group email 300 into a cluster that includes other similar emails. In some implementations, a "sending entity" and/or a subject may be used to group email into a cluster with other emails with a similarly-structured subject and the same sending entity. A "sending entity" may not be limited to a single email address, but instead may refer generally to a source of communications (e.g., an airline, a retailer) that may utilize more than one email address to transmit B2C communications. For example, an airline may send itineraries from "customer_service@airline.com," "reminder@airline.com," "check-in@airline.com," and so forth. In various embodiments, various pattern recognition techniques such as regular expressions may be used to determine that a particular sender email address (e.g., "utopia_A2@utopiaair.com") is actually associated with a sending entity (e.g., Utopia Airways in this hypothetical).

Once email 300 is grouped with other similar emails in a cluster, a data extraction template may be generated for that cluster using various combinations of the techniques described above. Transient data that is unlikely shared among more than a few emails of the cluster may be identified, e.g., by path classifier engine 126. For example, structural paths underlying the data following the "Departs:" and "Arrives:" labels (e.g., 8:00 am Louisville, Ky.," "9:36 am Cleveland, Ohio," etc.) may be considered transient because it is unlikely that more than a small fraction of the emails in the cluster will contain the exact same text associated with the structural paths underlying these segments of text. The same goes for other pieces of information, like the price paid ("$567.32"), the credit card number/expiration date, the passenger's address and other contact information, and so forth.

By contrast, structural paths associated with underlying segments of text that are likely boilerplate shared among many or all emails of the cluster may be classified, e.g., by path classifier engine 126, as fixed. These may include structural paths underlying segments of text like the title "Utopian Airways," "Passenger Information," "Payment," and the text at the bottom informing the user when to arrive at the airport and how much checked bags will cost.

Various fonts and/or symbols may be interpreted, e.g., by path classifier engine 126, as cues or hints as to whether a particular segment of text is transient or fixed. For example, presence of a semicolon, particularly if the next structural path is transient, may be highly indicative that the segment of text is associated with a fixed structural path. Other cues may include but are not limited to font, location, definition, synonyms, and so forth. In some embodiments, if fixed or transient text of an email tends to have a particular font (e.g., bold, italicized, etc.), then the fact that a yet-to-be classified segment of text has the same font as fixed or transient text may be probative of the structural path underlying that segment of text being fixed or transient, as the case may be.

As noted above, various signals such as nearby fixed text may be used, e.g., by semantic classifier engine 128, to associate one or more semantic data types with the various transient structural paths. For example, the structural path underlying the text "8:00 am Louisville, Ky." may be classified as a departure data and location based on the context of email 300 (providing the passenger's itinerary) and/or nearby fixed text, such as "Departs:". The structural path underlying "$567.32" may be classified as payment made based on, for example, its proximity to the fixed text, "Payment:".

Structural paths that otherwise may be classified as transient may further (or alternatively) be classified as "confidential" (or "private," "sensitive," etc.) based on one or more semantic data types assigned to them. For instance, in FIG. 3, the user's name and/or contact information, as well as the user's credit card number and/or payment amount, while transient, may additionally or alternatively be classified confidential. The structural paths underlying these segments of text may be so-designated in a data extraction template generated downstream, so that this information is ignored or discarded in the future, preserving users' privacy.

Figure 4:
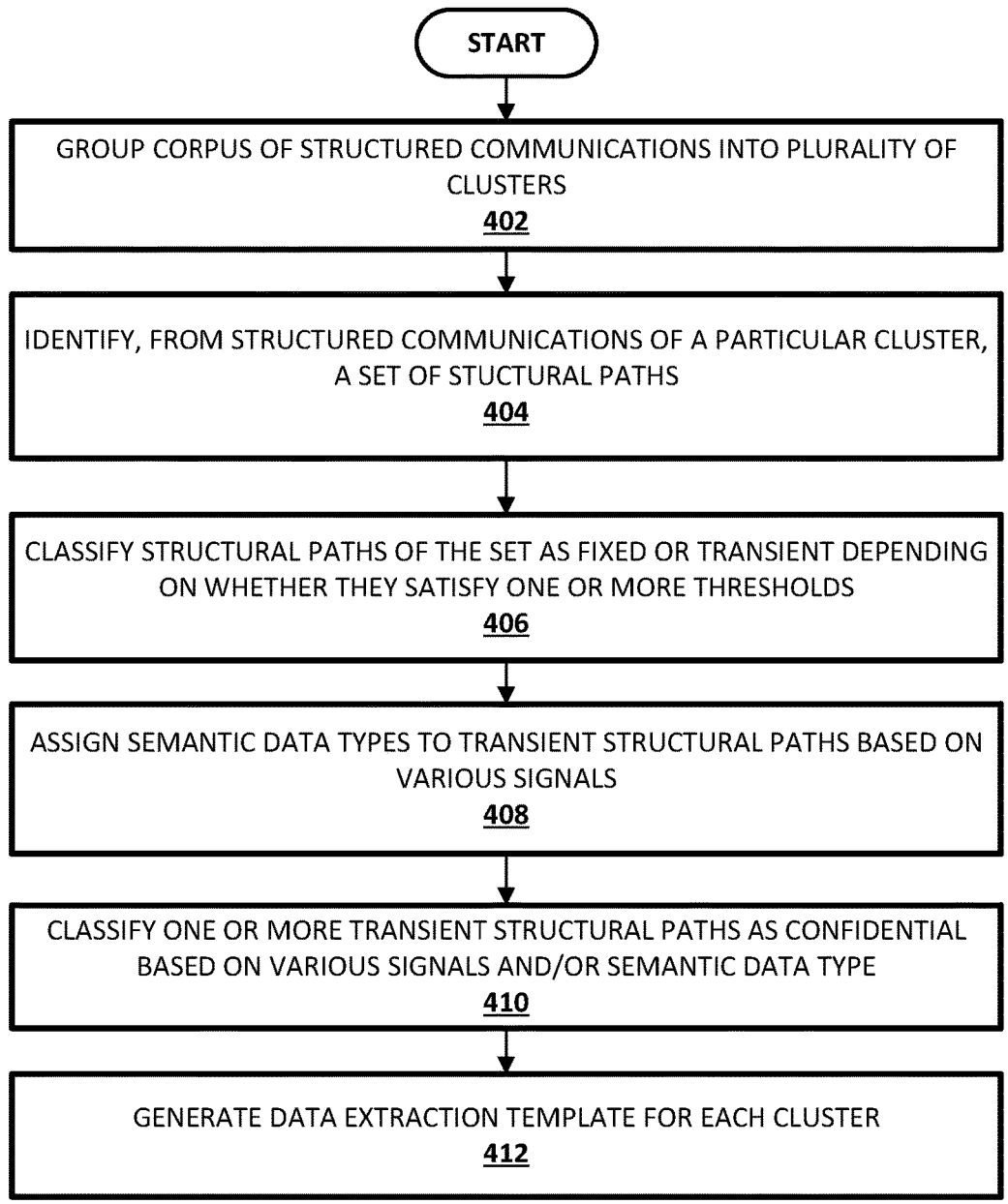
FIG. 4 depicts a flow chart illustrating an example method of generating data extraction templates.

Referring now to FIG. 4, an example method 400 of clustering structured communications and generating data extraction templates is described. For convenience, the operations of the flow chart are described with reference to a system that performs the operations. This system may include various components of various computer systems. Moreover, while operations of method 400 are shown in a particular order, this is not meant to be limiting. One or more operations may be reordered, omitted or added.

At block 402, the system may group a corpus of structured communications into a plurality of clusters, e.g., based on one or more pieces of metadata associated with each structured communication. For instance, a sending entity in combination with one or more textual patterns in an email subject may be used to select a cluster for an email. At block 404, the system may identify, from structured communications in a particular cluster, a set of structural paths (e.g., xPaths).

At block 406, the system may classify one or more structural paths of the set identified at block 404 as fixed or transient, e.g., depending on whether segments of text associated with each structural path satisfies one or more thresholds or other criteria. At block 408, the system may assign one or more semantic data types of each structural path classified as transient at block 406, e.g., based on various signals described above.

At block 410, the system may classify (or reclassify) one or more transient structural paths as confidential based on various signals and/or semantic data types assigned to the one or more structural data paths at block 408. For example, a transient structural path that is assigned the semantic data type "user address" may be classified as confidential. A transient structural path that is assigned the semantic data type "product dimensions" may be classified as non-confidential (depending on the context).

At block 412, the system may generate a data extraction template for each cluster. As noted above as shown in FIG. 2, the data extraction template may be usable, e.g., by data extraction engine 240, to extract, from subsequent structured communications, segments of text associated with non-confidential transient structural data paths, and to ignore and/or discard segments of text associated with fixed and/or confidential structural paths.

Figure 5:
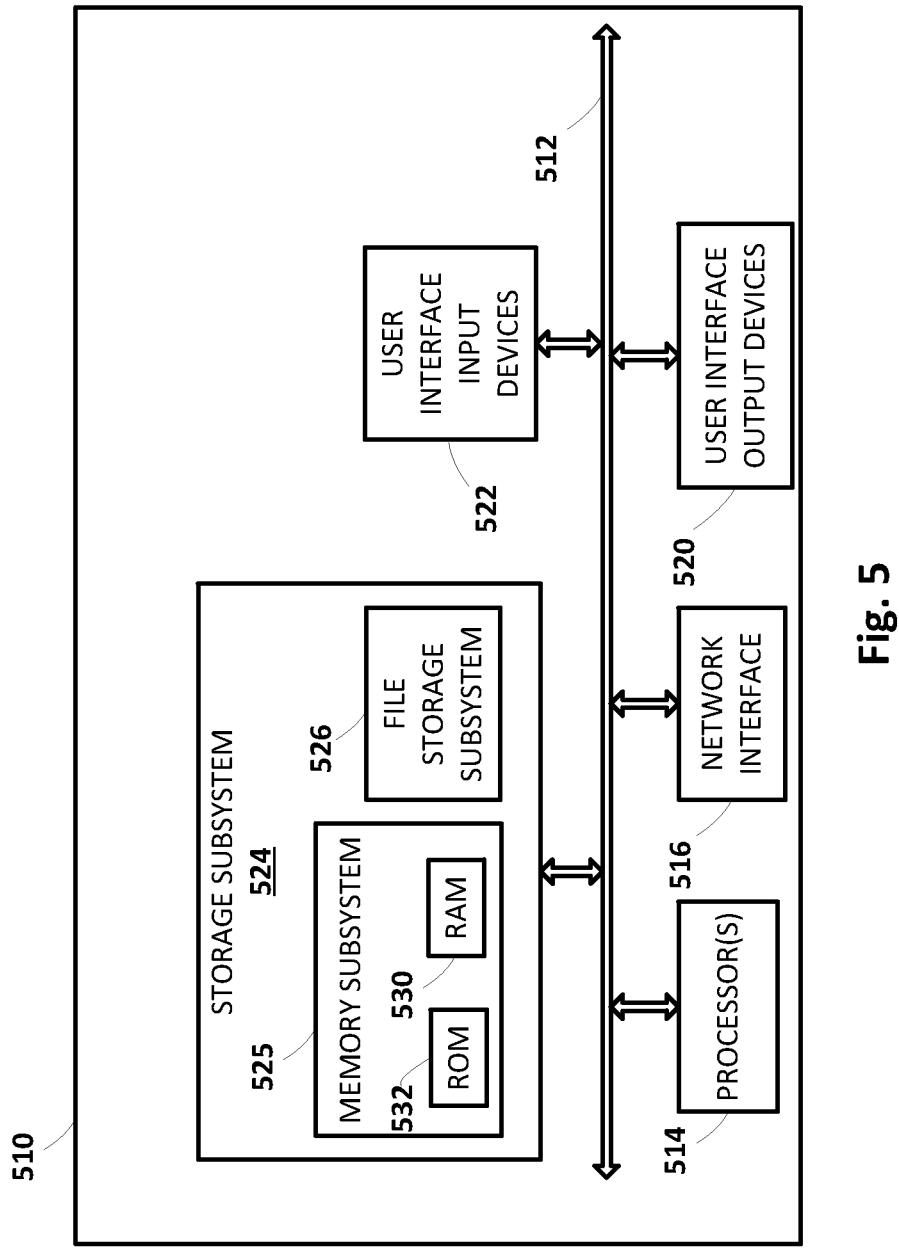
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and/or to implement one or more of cluster engine 124, path classifier engine 126, semantic classifier engine 128, signal engine 130, template generation engine 132, and/or data extraction engine 240.

These software modules are generally executed by processor 514 alone or in combination with other processors.

Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method for generating and applying data extraction templates to extract transient content from structured communications created automatically using templates, comprising:
grouping a corpus of structured communications into a plurality of clusters based on metadata associated with each structured communication;
identifying, from structured communications of a particular cluster, a set of structural paths;
classifying a first structural path of the set of structural paths, associated with a first segment of text, as transient in response to a determination that a count of occurrences of the first segment of text across the particular cluster satisfies a criterion;
classifying a second structural path of the set of structural paths, associated with a second segment of text, as fixed in response to a determination that a frequency of occurrences of the second segment of text across the particular cluster does not satisfy the criterion;
generating a data extraction template to extract, from one or more structured communications, one or more segments of text associated with the transient structural path;
configuring the data extraction template so that one or more segments of text associated with the fixed structural path are ignored in one or more subsequent structured communications;
associating a subsequent structured communication with the particular cluster based on metadata associated with the subsequent structured communication; and
applying the data extraction template associated with the particular cluster to the subsequent structured communication to extract one or more segments of text associated with the transient structural path.

2. The computer-implemented method of claim 1, wherein the metadata associated with each structured communication comprises a subject.

3. The computer-implemented method of claim 1, wherein the metadata associated with each structured communication comprises data indicative of a sending entity.

4. The computer-implemented method of claim 3, wherein the grouping comprises associating a plurality of different sender identifiers with a single sending entity based on one or more textual patterns shared among the plurality of different sender identifiers.

5. The computer-implemented method of claim 1, further comprising assigning a semantic data type to the transient structural path based on one or more signals related to the structured communications of the particular cluster.

6. The computer-implemented method of claim 5, wherein the one or more signals include a context of the structured communications of the particular cluster.

7. The computer-implemented method of claim 5, wherein the one or more signals include one or more fixed segments of text contained in structured communications of the particular cluster within a particular distance of the first segment of text.

8. The computer-implemented method of claim 5, wherein the one or more signals include one or more patterns detected in the first segment of text.

9. The computer-implemented method of claim 1, wherein identifying comprises identifying, based on structured communications of the particular cluster, a set of XPaths.

10. The computer-implemented method of claim 1, wherein the identifying comprises generating a bipartite graph, with the set of structural paths forming a first set of structural path nodes and corresponding textual segments forming a second set of textual segment nodes, and edges connecting structural path nodes to corresponding textual segment nodes.

11. The computer-implemented method of claim 1, wherein generating the data extraction template comprises generating the data extraction template to ignore, in one or more structured communications, one or more segments of text associated with the transient structural path in response to a determination, based on one or more signals related to structured communications of the particular cluster, that a semantic data type of the transient structural path is confidential.

12. A system that generates and applies data extraction templates to extract transient content from structured communications created automatically using templates, the system including memory and one or more processors operable to execute instructions stored in the memory, and comprising instructions to:
  group a corpus of structured communications into a plurality of clusters based on one or more similarities between structured communications of the corpus;
  identify, from structured communications of a particular cluster, a set of structural paths, wherein to identify the set of structural paths, a bipartite graph is generated, with the set of structural paths forming a first set of structural path nodes and corresponding textual segments forming a second set of textual segment nodes, and edges connecting structural path nodes to corresponding textual segment nodes;
  classify a first structural path of the set of structural paths, associated with a first segment of text, as transient in response to a determination that a count of occurrences of the first segment of text across the particular cluster satisfies a criterion;
  determine a semantic data type of the transient structural path based on one or more signals related to the structured communications of the particular cluster; and
  generate a data extraction template to extract, from one or more structured communications, one or more segments of text associated with the transient structural path;
  associate a subsequent structured communication with the particular cluster based on one or more similarities between the subsequent structured communication and structured communications of the particular cluster; and
  apply the data extraction template associated with the particular cluster to the subsequent structured communication to extract one or more segments of text associated with the transient structural path.

13. The system of claim 12, wherein the instructions further include instructions to group the corpus of structured communications into the plurality of clusters based on metadata associated with each structured communication or textual similarity between two or more structured communications.

14. The system of claim 13, wherein the metadata associated with each structured communication comprises a subject or data indicative of a sending entity.

15. The system of claim 14, wherein the instructions further include instructions to associate a plurality of different sender identifiers with a single sending entity based on one or more textual patterns shared among the plurality of different sender identifiers.

16. The system of claim 12, wherein the one or more signals include a context of the structured communications of the particular cluster.

17. The system of claim 12, wherein the one or more signals include one or more fixed segments of text contained in structured communications of the particular cluster within a particular distance of the first segment of text.

18. A non-transitory computer-readable medium comprising instructions that, in response to execution of the instructions by a computing system, cause the computing system to generate and apply data extraction templates to extract transient content from structured communications created automatically using templates, including performing the following operations:
  identifying, from a corpus of structured communications, a set of structural paths;
  classifying a first structural path of the set of structural paths, associated with a first segment of text, as transient in response to a determination that a count of occurrences of the first segment of text across the corpus satisfies a criterion;
  determining a semantic data type of the transient structural path based on one or more signals related to the structured communications of the corpus;
  generating a data extraction template to extract, from one or more structured communications, one or more segments of text associated with the transient structural path where the semantic data type of the transient structural path is non-confidential, wherein generating the data extraction template further comprises generating the data extraction template to ignore, in one or more subsequent structured communications, one or more segments of text associated with the transient structural path in response to a determination, based on one or more signals related to structured communications of the particular cluster, that a semantic data type of the transient structural path is confidential; and
  associating a subsequent structured communication with the data extraction template based on metadata associated with the subsequent structured communication; and
  applying the data extraction template to the subsequent structured communication to extract one or more segments of text associated with the transient structural path.

* * * * *